(12) United States Patent
Kariatsumari

(10) Patent No.: US 8,897,964 B2
(45) Date of Patent: Nov. 25, 2014

(54) MOTOR CONTROL DEVICE

(71) Applicant: JTEKT Corporation, Osaka-shi, Osaka (JP)

(72) Inventor: Yuji Kariatsumari, Yamatotakada (JP)

(73) Assignee: JTEKT Corporation, Osaka (JP)

( * ) Notice: Subject to any disclaimer, the term of this patent is extended or adjusted under 35 U.S.C. 154(b) by 0 days.

(21) Appl. No.: 13/867,397

(22) Filed: Apr. 22, 2013

(65) Prior Publication Data

US 2013/0304325 A1   Nov. 14, 2013

(30) Foreign Application Priority Data

May 10, 2012   (JP) ................. 2012-108509

(51) Int. Cl.
*B62D 5/04* (2006.01)
*B62D 5/065* (2006.01)
*B62D 5/09* (2006.01)
*H02P 7/285* (2006.01)

(52) U.S. Cl.
CPC ............. *B62D 5/0463* (2013.01); *B62D 5/065* (2013.01); *B62D 5/09* (2013.01); *H02P 7/285* (2013.01)
USPC ........................................................ 701/42

(58) Field of Classification Search
USPC ........................................................ 701/42
See application file for complete search history.

(56) References Cited

U.S. PATENT DOCUMENTS

| 6,260,655 B1 | 7/2001 | Mukai et al. |
| 6,863,150 B1 * | 3/2005 | Tanaka et al. ................. 180/446 |
| 2010/0134064 A1 * | 6/2010 | Heikkila ....................... 318/802 |

FOREIGN PATENT DOCUMENTS

| EP | 2 426 032 A2 | 3/2012 |
| EP | 2 448 106 A1 | 5/2012 |
| FR | 2 790 094 A1 | 8/2000 |
| JP | A-11-059463 | 3/1999 |

OTHER PUBLICATIONS

Extended European Search Report issued in European Application No. 13166399.9 dated Sep. 19, 2013.

* cited by examiner

*Primary Examiner* — Mary Cheung
*Assistant Examiner* — Anne Mazzara
(74) *Attorney, Agent, or Firm* — Oliff PLC

(57) ABSTRACT

A motor control device has characteristic information that indicates a correlation between a rotation speed and a current of a motor. The motor control device sets a rotation speed characteristic value that is a reference value of the rotation speed of the motor and a current characteristic value that is a reference value of the current of the motor on the basis of the characteristic information. The motor control device calculates an estimated rotation speed on the basis of a measured value of a voltage that is applied to the motor, a measured value of the current, the current characteristic value, a voltage characteristic value, the rotation speed characteristic value and a counter-electromotive force constant.

7 Claims, 4 Drawing Sheets

MOTOR CONTROL DEVICE

INCORPORATION BY REFERENCE/RELATED APPLICATION

This application claims priority to Japanese Patent Application No. 2012-108509 filed on May 10, 2012 the disclosure of which, including the specification, drawings and abstract, is incorporated herein by reference in its entirety.

BACKGROUND OF THE INVENTION

1. Field of the Invention

The invention relates to a motor control device that calculates a rotation speed of a motor.

2. Discussion of Background

A control device for an electric power steering system, which is described in U.S. Pat. No. 6,260,655 B1, calculates an estimated value of a rotation speed of a motor on the basis of a voltage value of the motor, which is measured by a voltage sensor, a current value of the motor, which is measured by a current sensor, and an estimated resistance value that is an estimated value of a resistance of the motor. When the control device has determined that the rotation of the motor is stopped, the control device calculates an estimated resistance value of the motor by dividing the voltage value of the motor by the current value of the motor.

The resistance of the motor fluctuates during rotation of the motor. On the other hand, the control device does not update the estimated resistance value during rotation of the motor. Therefore, there is a possibility that, during rotation of the motor, a deviation in the estimated resistance value that is used to calculate the rotation speed of the motor may increase. Therefore, there is a possibility that a deviation that is included in the estimated value of the rotation speed of the motor may also increase.

Here, the problem regarding the control device for an electric power steering system is referred to. However, a motor control device that calculates an estimated value of a rotation speed of a motor, such as a control device for an electro-hydraulic power steering system, also has the same problem.

SUMMARY OF THE INVENTION

The invention provides a motor control device that is able to reduce a deviation in rotation speed that is calculated during rotation of a motor.

According to a feature of an example of the invention, a motor control device that calculates an estimated speed value that is an estimated value of a rotation speed of a motor, wherein the motor control device has characteristic information that indicates a correlation between a rotation speed and a current as a characteristic of the motor, the motor control device sets a rotation speed characteristic value that is a reference value of the rotation speed of the motor and a current characteristic value that is a reference value of the current of the motor on the basis of the characteristic information, and the motor control device calculates the estimated speed value on the basis of a current value that is a measured value of the current that is supplied to the motor, a voltage value that is a measured value of a voltage that is applied to the motor, the current characteristic value, a voltage characteristic value that is a reference value of the voltage of the motor, which is measured at a time when the current value is the current characteristic value, the rotation speed characteristic value and a counter-electromotive force constant.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
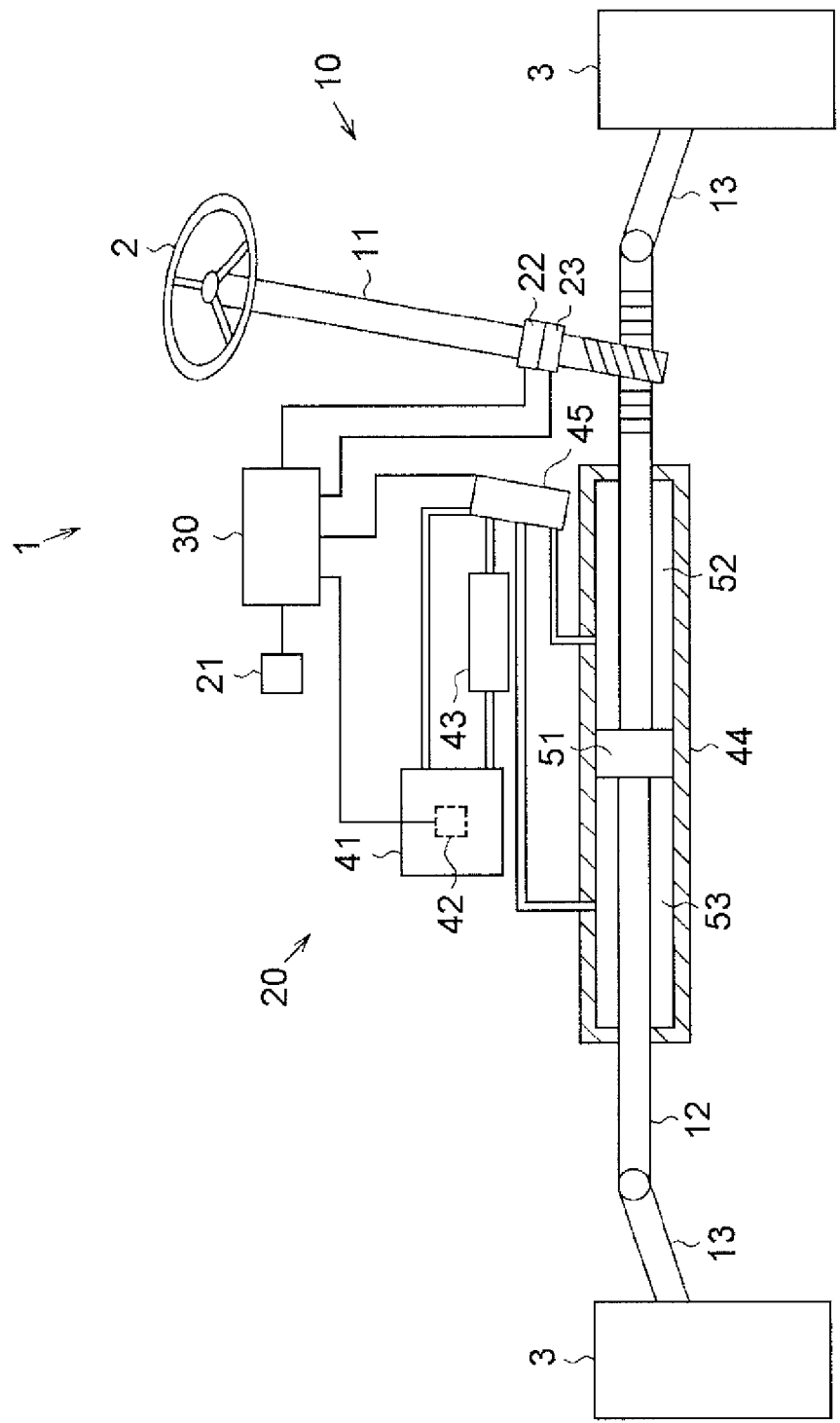
FIG. 1 is a configuration view of an electro-hydraulic power steering system according to an embodiment of the invention.

Hereinafter, embodiments of the invention will be described with reference to the accompanying drawings.

The overall configuration of an electro-hydraulic power steering system 1 will be described with reference to FIG. 1. The electro-hydraulic power steering system 1 includes a steering wheel 2, wheels 3, a steering device body 10 and a hydraulic assist device 20. The steering device body 10 includes a steering shaft 11, a rack shaft 12 and tie rods 13. The steering wheel 2 is coupled to an end portion of the steering shaft 11. The rack shaft 12 is in mesh with a gear of the steering shaft 11. The tie rods 13 couple end portions of the rack shaft 12 to the respective wheels 3.

The hydraulic assist device 20 includes a vehicle speed sensor 21, a steering angle sensor 22, a torque sensor 23, a hydraulic control device 30, a hydraulic pump 41, a motor 42, a reservoir 43, a hydraulic cylinder 44 and a flow control valve 45.

The vehicle speed sensor 21 generates a vehicle speed signal SS that varies on the basis of a travel speed of a vehicle. The steering angle sensor 22 generates a steering angle signal θS that varies on the basis of a rotation amount of the steering shaft 11. The torque sensor 23 generates a torque signal TS that varies on the basis of a twist amount of the steering shaft 11.

The hydraulic control device 30 controls a rotation speed ω of the motor 42 and an opening degree of the flow control valve 45 on the basis of the vehicle speed signal SS, the steering angle signal θS and the torque signal TS. The hydraulic pump 41 is connected to the reservoir 43 and the flow control valve 45. The hydraulic pump 41 delivers hydraulic fluid from the reservoir 43 to the flow control valve 45. The motor 42 generates torque for driving the hydraulic pump 41. The reservoir 43 stores hydraulic fluid for the hydraulic assist device 20.

The hydraulic cylinder 44 includes a piston 51, a first hydraulic chamber 52 and a second hydraulic chamber 53. The rack shaft 12 is inserted through the internal space of the hydraulic cylinder 44. The piston 51 is formed integrally with the rack shaft 12. The piston 51 partitions the internal space of the hydraulic cylinder 44 into the first hydraulic chamber 52 and the second hydraulic chamber 53. The first hydraulic chamber 52 and the second hydraulic chamber 53 are connected to the flow control valve 45.

The flow control valve 45 is connected to the hydraulic pump 41 that serves as a hydraulic fluid supply source. The flow control valve 45 is connected to the first hydraulic chamber 52 and the second hydraulic chamber 53 that serve as a hydraulic fluid supply destination and a hydraulic fluid drain source. The flow control valve 45 is connected to the reservoir 43 that serves as a hydraulic fluid drain destination from the first hydraulic chamber 52 or the second hydraulic chamber 53. The flow control valve 45 controls the flow rate of hydraulic fluid, the hydraulic fluid supply destination and the hydraulic fluid drain source.

As shown in FIG. 1, the operation of the electro-hydraulic power steering system 1 will be described. The hydraulic control device 30 calculates the opening degree of the flow control valve 45. The hydraulic control device 30 sets the hydraulic fluid supply destination to one of the first hydraulic chamber 52 and the second hydraulic chamber 53, and sets the hydraulic fluid drain source to the other of the first hydraulic chamber 52 and the second hydraulic chamber 53, on the basis of the direction of force F that is applied to the rack shaft 12 (hereinafter, assist direction). The hydraulic control device 30 generates a control signal CS that indicates the opening degree of the flow control valve 45, the hydraulic fluid supply destination and the hydraulic fluid drain source. When the hydraulic control device 30 has selected the leftward direction as the assist direction, the hydraulic control device 30 generates the control signal CA that indicates the first hydraulic chamber 52 as the hydraulic fluid supply destination and that indicates the second hydraulic chamber 53 as the hydraulic fluid drain source. When the hydraulic control device 30 has selected the rightward direction as the assist direction, the hydraulic control device 30 generates the control signal CS that indicates the second hydraulic chamber 53 as the hydraulic fluid supply destination and that indicates the first hydraulic chamber 52 as the hydraulic fluid drain source.

The piston 51 applies the leftward force F to the rack shaft 12 when hydraulic fluid is supplied to the first hydraulic chamber 52 and hydraulic fluid is drained from the second hydraulic chamber 53. The piston 51 applies the rightward force F to the rack shaft 12 when hydraulic fluid is supplied to the second hydraulic chamber 53 and hydraulic fluid is drained from the first hydraulic chamber 52.

The rack shaft 12 moves in a direction based on the rotation direction of the steering wheel 2 due to force that is applied from the steering shaft 11 and the force F that is applied from the piston 51.

Figure 2:
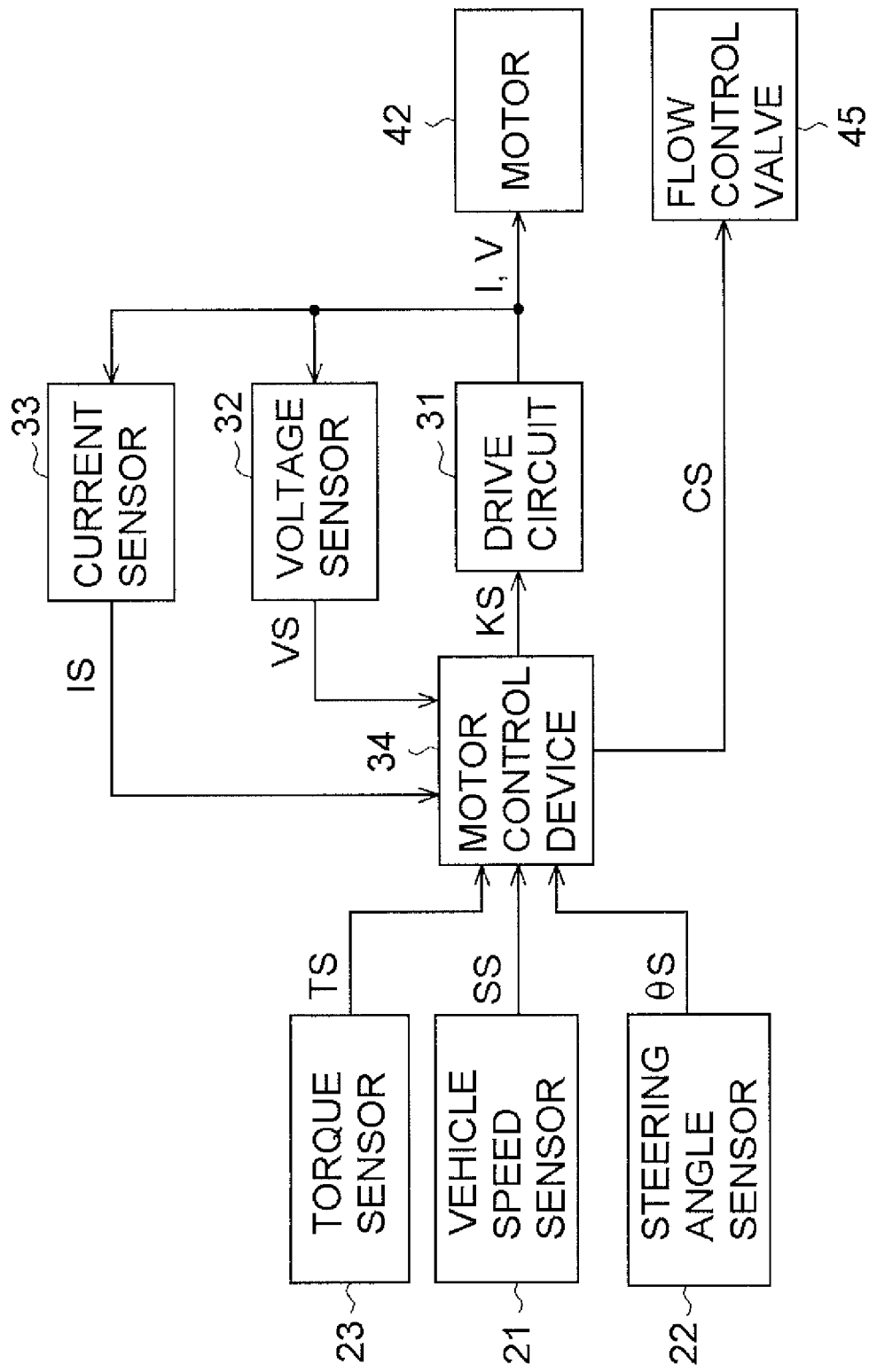
FIG. 2 is a block diagram that shows the configuration of a hydraulic control device according to the embodiment.

The configuration of the hydraulic control device 30 will be described with reference to FIG. 2. The hydraulic control device 30 includes a drive circuit 31, a voltage sensor 32, a current sensor 33 and a motor control device 34.

The drive circuit 31 controls a voltage V that is applied from a power supply (not shown) to the motor 42 in response to control executed by the motor control device 34. The voltage sensor 32 generates a voltage signal VS that varies on the basis of the voltage V that is applied from the drive circuit 31 to the motor 42. The current sensor 33 generates a current signal IS that varies on the basis of a current I that is supplied from the drive circuit 31 to the motor 42. The motor control device 34 controls the drive circuit 31 and the flow control valve 45 on the basis of the vehicle speed signal SS, the steering angle signal θS, the torque signal TS, the voltage signal VS and the current signal IS.

Control over the motor 42 and the flow control valve 45 will be described. The motor control device 34 determines the force F that is applied to the rack shaft 12 and the rotation direction of the steering wheel 2 on the basis of the vehicle speed signal SS, the steering angle signal θS and the torque signal TS. The motor control device 34 determines the assist direction on the basis of the rotation direction of the steering wheel 2.

The motor control device 34 calculates the flow rate of hydraulic fluid that is delivered from the hydraulic pump 41 on the basis of the force F. The motor control device 34 calculates a target value of the rotation speed ω of the motor 42 as a target rotation speed ωS on the basis of the flow rate of hydraulic fluid that is delivered from the hydraulic pump 41.

The motor control device 34 recognizes a measured value VC of the voltage V of the motor 42 and a measured value IC of the current I of the motor 42 on the basis of the voltage signal VS and the current signal IS. The motor control device 34 calculates an estimated rotation speed ωM on the basis of the measured value IC of the current I, the measured value VC of the voltage V and the characteristic value of the motor 42. The estimated rotation speed ωM corresponds to an estimated speed value.

The motor control device 34 calculates a target value VT of the voltage V that is applied to the motor 42 on the basis of a difference between the estimated rotation speed ωM and the target rotation speed ωS. The motor control device 34 generates a drive signal KS for bringing the voltage V, which is applied from the drive circuit 31 to the motor 42, to the target value VT.

The motor control device 34 calculates the opening degree of the flow control valve 45 on the basis of the flow rate of hydraulic fluid or torque. The motor control device 34 determines the hydraulic fluid supply destination and the hydraulic fluid drain source on the basis of the assist direction. The motor control device 34 generates the control signal CS that indicates the opening degree of the flow control valve 45, the hydraulic fluid supply destination and the hydraulic fluid drain source.

The process of calculating the estimated rotation speed ωM, which is executed by the motor control device 34, will be described. The following mathematical expression (1) is a mathematical expression for calculating the estimated rotation speed ωM of the motor 42. In the following mathematical expressions, "R" denotes the resistance of the motor 42, and "K" denotes the counter-electromotive force constant of the motor 42.

$$\omega M = \frac{1}{K}(VC - R \cdot IC) \qquad (1)$$

The following mathematical expression (2) is a mathematical expression for calculating the resistance R. The mathematical expression (2) is derived by modifying the mathematical expression (1).

$$R = \frac{VC - K \cdot \omega M}{IC} \qquad (2)$$

The motor control device 34 stores the measured value IC, measured value VC and estimated rotation speed ωM at predetermined timing as a current characteristic value ID, a voltage characteristic value VD and a rotation speed characteristic value ωD that are the respective characteristic values. The following mathematical expression (3) is a mathematical expression that uses the current characteristic value ID, the voltage characteristic value VD and the rotation speed characteristic value ωD for the mathematical expression (2).

$$R = \frac{VD - K \cdot \omega D}{ID} \quad (3)$$

The following mathematical expression (4) is a mathematical expression for calculating the estimated rotation speed ωM. The mathematical expression (4) is derived by substituting the mathematical expression (3) into the mathematical expression (1).

$$\omega M = \frac{1}{K}\left(VC - \frac{IC}{ID}VD\right) + \omega D \frac{IC}{ID} \quad (4)$$

Figure 3:
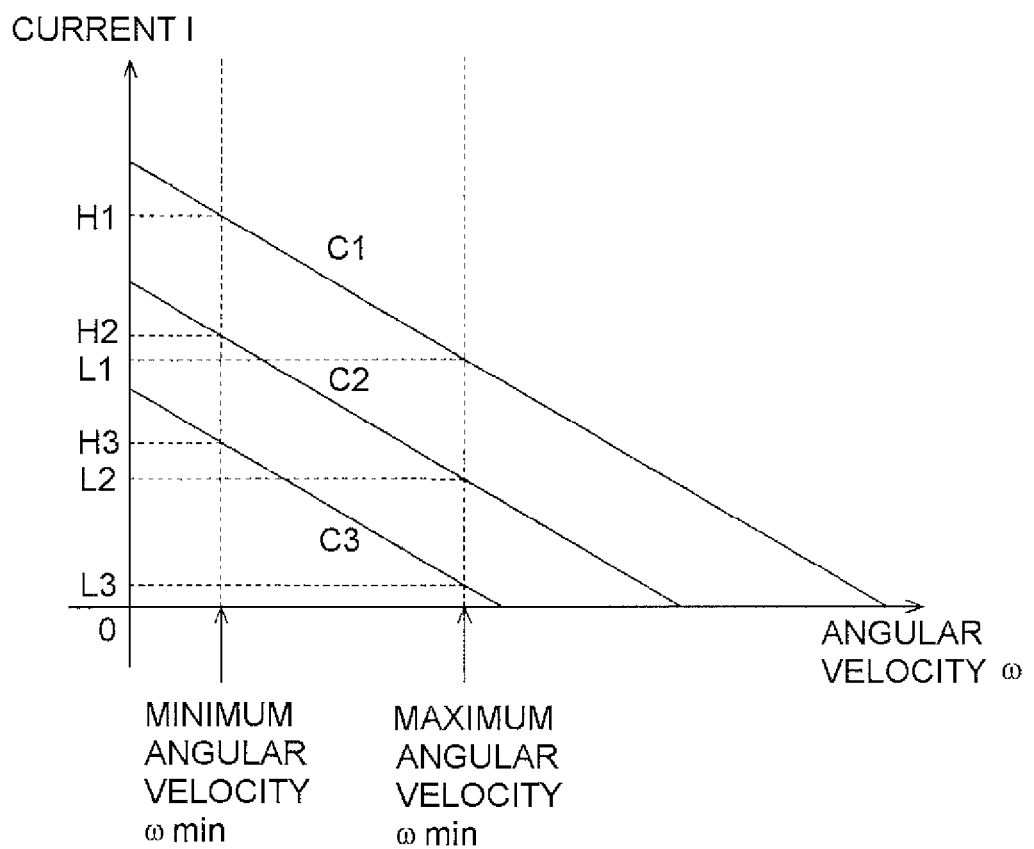
FIG. 3 is a map that shows the characteristic information on a motor according to the embodiment.

The process of storing the current characteristic value ID, the voltage characteristic value VD and the rotation speed characteristic value ωD, which is executed by the motor control device 34, will be described with reference to FIG. 3. The motor control device 34 stores a mathematical expression that defines the correspondence relationship between a current I that is supplied to the motor 42 and a rotation speed ω (hereinafter, characteristic information (FIG. 3)). As shown in FIG. 3, the current I and the rotation speed ω have an inversely proportional correspondence relationship. The mathematical expression that defines the characteristic information is expressed by the following mathematical expression (5) obtained by modifying the mathematical expression (2).

$$IC = \frac{VC - K \cdot \omega M}{R} \quad (5)$$

The motor control device 34 executes control for bringing the rotation speed ω of the motor 42 to the target rotation speed ωS and control for preventing the rotation speed ω of the motor 42 from becoming higher than a predetermined value, in parallel with each other. Therefore, the motor control device 34 determines whether the rotation speed ω of the motor 42 is a predetermined maximum rotation speed characteristic value ωMAX on the basis of the measured value IC.

The motor control device 34 calculates a lower limit current characteristic value IMIN corresponding to the maximum rotation speed characteristic value ωMAX by substituting the maximum rotation speed characteristic value ωMAX, the measured value VC and a predetermined initial value of the resistance R (hereinafter, initial resistance RS) into the mathematical expression (5).

The motor control device 34 determines the timing, at which the measured value IC is the lower limit current characteristic value IMIN, as first update timing that is the predetermined timing. At the first update timing, the motor control device 34 updates the current characteristic value ID to the lower limit current characteristic value IMIN, updates the voltage characteristic value VD to the measured value VC, and updates the rotation speed characteristic value ωD to the maximum rotation speed characteristic value ωMAX. The voltage characteristic value VD that is updated at the first update timing corresponds to a lower limit voltage characteristic value.

The motor control device 34 executes control for bringing the rotation speed ω of the motor 42 to the target rotation speed ωS and control for preventing the rotation speed ω of the motor 42 from becoming lower than a predetermined value, in parallel with each other. Therefore, the motor control device 34 determines whether the rotation speed ω of the motor 42 is a predetermined minimum rotation speed characteristic value ωMIN on the basis of the measured value IC.

The motor control device 34 calculates an upper limit current characteristic value IMAX of current, which corresponds to the minimum rotation speed characteristic value ωMIN, by substituting the minimum rotation speed characteristic value ωMIN, the measured value VC and the initial resistance RS into the mathematical expression (5).

The motor control device 34 determines the timing, at which the current I is the upper limit current characteristic value IMAX, as second update timing that is the predetermined timing. At the second update timing, the motor control device 34 updates the current characteristic value ID to the upper limit current characteristic value IMAX, updates the voltage characteristic value VD to the measured value VC, and updates the rotation speed characteristic value ωD to the minimum rotation speed characteristic value ωMIN. The voltage characteristic value VD that is updated at the second update timing corresponds to an upper limit voltage characteristic value.

A deviation that is included in the estimated rotation speed ωM will be described. The estimated rotation speed ωM has an estimated deviation ΔωM. The rotation speed characteristic value ωD has a deviation ΔωD. Therefore, the mathematical expression (4) is modified into the following mathematical expression (6) when the estimated deviation ΔωM and the deviation ΔωD are used.

$$\omega M + \Delta \omega M = \frac{1}{K}\left(VC - \frac{IC}{ID}VD\right) + (\omega D + \Delta \omega D)\frac{IC}{ID} \quad (6)$$

The minimum rotation speed characteristic value ωMIN is stored in the motor control device 34 as an actual measured value of the rotation speed ω when the current I of the upper limit current characteristic value IMAX is supplied to the motor 42, and the maximum rotation speed characteristic value ωMAX is stored in the motor control device 34 as an actual measured value of the rotation speed ω when the current I of the lower limit current characteristic value IMIN is supplied to the motor 42. That is, updating the current characteristic value ID, the voltage characteristic value VD and the rotation speed characteristic value ωD at the first update timing or the second update timing results in updating the current characteristic value ID, the voltage characteristic value VD and the rotation speed characteristic value ωD to values close to values at the time when the measured value of the rotation speed ω has been measured.

Thus, the motor control device 34 is able to minimize the deviation ΔωD by updating the current characteristic value ID, the voltage characteristic value VD and the rotation speed characteristic value ωD at the first update timing or the second update timing.

The following mathematical expression (7) is a mathematical expression for calculating the estimated deviation ΔωM. The mathematical expression (7) is derived by substituting the mathematical expression (4) into the left-hand side of the mathematical expression (6) and then organizing the resultant mathematical expression.

$$\Delta \omega M = \frac{IC}{ID} \Delta \omega D \qquad (7)$$

As expressed by the mathematical expression (7), the estimated deviation ΔωM is directly proportional to the deviation ΔωD. Therefore, the motor control device 34 is able to reduce the estimated deviation ΔωM of the estimated rotation speed ωM to a predetermined minimum value by minimizing the deviation ΔωD.

Figure 4:
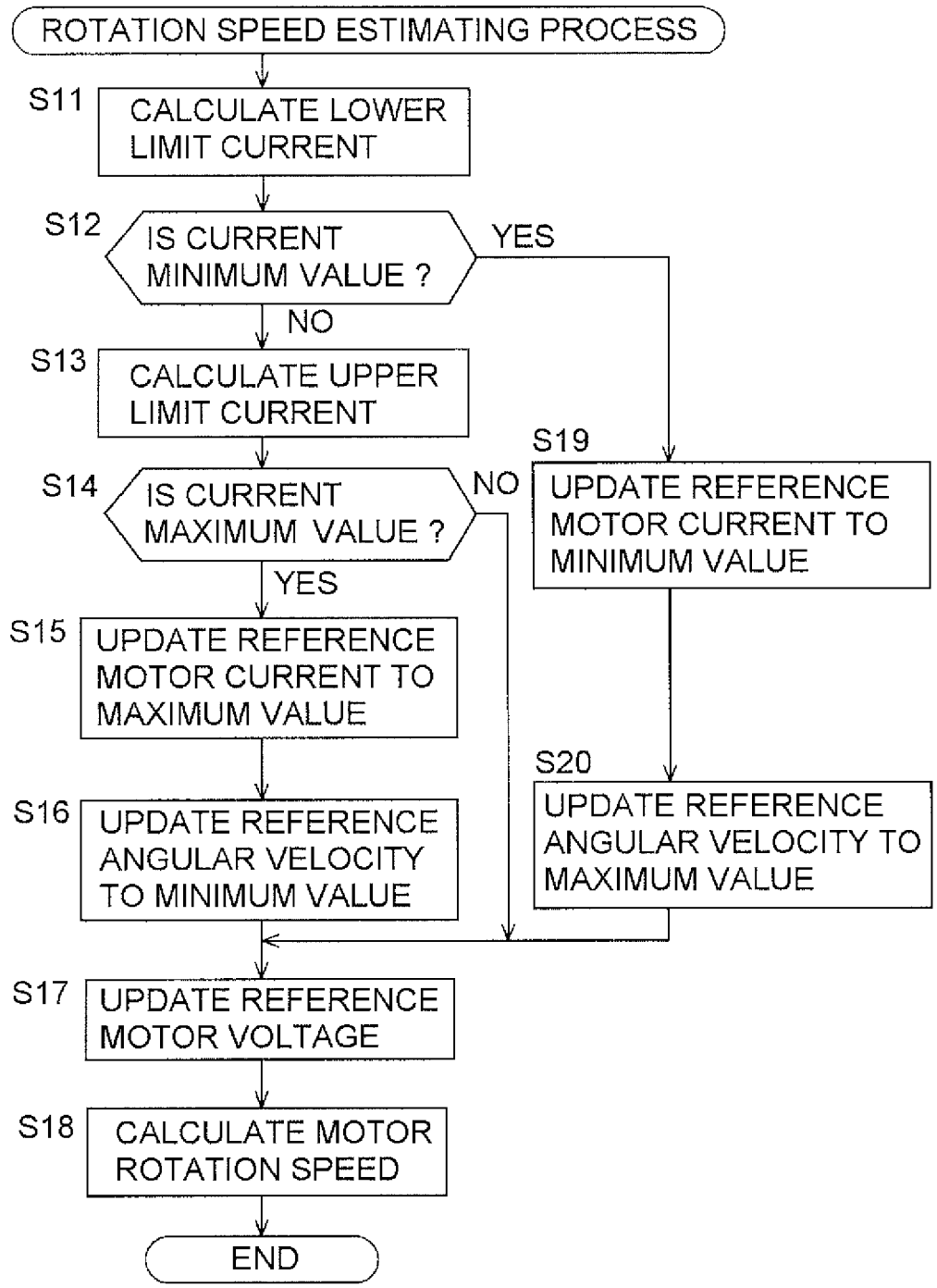
FIG. 4 is a flowchart that shows the procedure of rotation speed estimating process that is executed by a motor control device according to the embodiment.

The rotation speed calculation process that is executed by the motor control device 34 will be described with reference to FIG. 4. In step S11, the motor control device 34 calculates the lower limit current characteristic value IMIN corresponding to the maximum rotation speed characteristic value ωMAX by substituting the measured value VC, the initial resistance RS and the maximum rotation speed characteristic value ωMAX into the mathematical expression (5).

In step S12, the motor control device 34 determines whether the measured value IC is the lower limit current characteristic value IMIN. When negative determination is made in step S11, the motor control device 34 proceeds with the process to step S13. When affirmative determination is made in step S12, the motor control device 34 proceeds with the process to step S19.

In step S13, the motor control device 34 calculates the upper limit current characteristic value IMAX by substituting the measured value VC, the initial resistance RS and the minimum rotation speed characteristic value ωMIN into the mathematical expression (5).

In step S14, the motor control device 34 determines whether the measured value IC is the upper limit current characteristic value IMAX. When affirmative determination is made in step S14, the motor control device 34 proceeds with the process to step S15. When negative determination is made in step S14, the motor control device 34 proceeds with the process to step S17.

In step S15, the motor control device 34 updates the current characteristic value ID from a value that is set at that time point to the upper limit current characteristic value IMAX. In step S16, the motor control device 34 updates the rotation speed characteristic value ωD from a value that is set at that time point to the minimum rotation speed characteristic value ωMIN.

In step S19, the motor control device 34 updates the current characteristic value ID from a value that is set at that time point to the lower limit current characteristic value IMIN. In step S20, the motor control device 34 updates the rotation speed characteristic value ωD from a value that is set at that time point to the maximum rotation speed characteristic value ωMAX.

In step S17, the motor control device 34 updates the voltage characteristic value VD from a value that is set at that time point to the measured value VC. In step S18, the motor control device 34 calculates the estimated rotation speed ωM by substituting the measured value VC, the measured value IC, the current characteristic value ID, the voltage characteristic value VD, the rotation speed characteristic value ωD and the counter-electromotive force constant K into the mathematical expression (4).

The motor control device 34 according to the present embodiment has the following advantageous effects. During operation of the motor 42, the motor control device 34 updates the current characteristic value ID, the voltage characteristic value VD and the rotation speed characteristic value ωD at the predetermined timing. The motor control device 34 calculates the estimated rotation speed ωM on the basis of the current characteristic value ID, the voltage characteristic value VD, the rotation speed characteristic value ωD, the measured value IC, the measured value VC and the counter-electromotive force constant K. The resistance R of the motor 42 fluctuates during operation of the motor 42. The resistance R of the motor 42 is calculated on the basis of the current characteristic value ID, the voltage characteristic value VD, the rotation speed characteristic value ωD and the counter-electromotive force constant K by using the mathematical expression (3). With the above configuration, the motor control device 34 updates the current characteristic value ID, the voltage characteristic value VD and the rotation speed characteristic value ωD during operation of the motor 42. Therefore, the motor control device 34 is able to calculate the estimated rotation speed ωM as a numeric value with the estimated deviation ΔωM reduced by taking the fluctuations of the resistance R into consideration.

The invention includes embodiments other than the above-described embodiment. Hereinafter, modified examples of the above-described embodiment as other embodiments of the invention will be described. The following modified examples may be combined with each other.

The motor control device 34 according to the above embodiment updates the current characteristic value ID, the voltage characteristic value VD and the rotation speed characteristic value ωD when the measured value IC is the lower limit current characteristic value IMIN or the upper limit current characteristic value IMAX. In contrast, the motor control device 34 according to a modified example updates the current characteristic value ID, the voltage characteristic value VD and the rotation speed characteristic value ωD when the measured value IC in the characteristic curve is a determination current IMID between the lower limit current characteristic value IMIN and the upper limit current characteristic value IMAX. A value prescribed on a map in advance is used as the determination current IMID. In short, the current value for determining update timing is not limited to the lower limit current characteristic value IMIN and the upper limit current characteristic value IMAX. As long as a current value is in the characteristic curve, the current value may be used as a current value for determining update timing.

The motor control device 34 according to the above embodiment does not calculate the resistance R during rotation of the motor 42. In contrast, a motor control device according to a modified example calculates the resistance R during rotation of the motor 42 by substituting the current characteristic value ID, the voltage characteristic value VD, the rotation speed characteristic value ωD and the counter-electromotive force constant K into the mathematical expression (3).

The motor control device 34 according to the above embodiment controls the motor 42 of the hydraulic pump 41. In contrast, a motor control device according to a modified example controls a motor in another device, such as a motor of an electric power steering system and a motor that drives a pump for circulating transmission oil during idling stop of a vehicle.

The motor control device 34 according to the above embodiment stores the mathematical expression that defines the characteristic information. In contrast, the motor control device 34 according to a modified example stores a characteristic information map that shows the current characteristic value ID, the voltage characteristic value VD and the rotation speed characteristic value ωD in correspondence with one another on the basis of the mathematical expression.

The motor control device 34 according to the above embodiment determines the first update timing and the second update timing on the basis of the two current characteristic values, that is, the upper limit current characteristic value IMAX and the lower limit current characteristic value MIN. In contrast, the motor control device 34 according to a modified example updates the current characteristic value ID, the voltage characteristic value VD and the rotation speed characteristic value ωD by making determination as to the predetermined timing on the basis of any one of the current characteristic values or three or more current characteristic values.

What is claimed is:

1. A motor control device that calculates an estimated speed value that is an estimated value of a rotation speed of a motor, comprising:
 a memory; and
 a processor configured to:
  store, in the memory, characteristic information that indicates a correlation between a rotation speed and a current of the motor during operation,
  set a rotation speed characteristic value that is a reference value of the rotation speed of the motor during operation and a current characteristic value that is a reference value of the current of the motor during operation on the basis of the characteristic information, and
  calculate, by the processor, the estimated speed value on the basis of a current value that is a measured value of the current that is supplied to the motor, a voltage value that is a measured value of a voltage that is applied to the motor, the current characteristic value, a voltage characteristic value that is a reference value of the voltage of the motor during operation, which is measured at a time when the current value is the current characteristic value, the rotation speed characteristic value and a counter-electromotive force constant.

2. The motor control device according to claim 1, wherein the processor is configured to:
 store, in the memory, a map that indicates the correlation between the rotation speed and the current of the motor as the characteristic information, and an upper limit value of the current, which is supplied to the motor in control over the motor, in the map,
 set the upper limit value of the current as the current characteristic value, and
 set a value of the rotation speed corresponding to the current characteristic value as the rotation speed characteristic value.

3. The motor control device according to claim 1, wherein the processor is configured to:
 store, in the memory, a map that indicates the correlation between the rotation speed and the current of the motor as the characteristic information, and a lower limit value of the current, which is supplied to the motor in control over the motor, in the map,
 set the lower limit value of the current as the current characteristic value, and
 set a value of the rotation speed corresponding to the current characteristic value as the rotation speed characteristic value.

4. The motor control device according to claim 1, wherein the processor is configured to:
 store a map that indicates the correlation between the rotation speed and the current of the motor as the characteristic information, and an upper limit value and a lower limit value of the current, which is supplied to the motor in control over the motor, in the map,
 set the upper limit value of the current as an upper limit current characteristic value that is the current characteristic value,
 set the lower limit value of the current as a lower limit current characteristic value that is the current characteristic value,
 set a value of the rotation speed corresponding to the upper limit current characteristic value as a minimum rotation speed characteristic value that is the rotation speed characteristic value, and
 set a value of the rotation speed corresponding to the lower limit current characteristic value as a maximum rotation speed characteristic value that is the rotation speed characteristic value.

5. The motor control device according to claim 4, wherein the processor is configured to:
 calculate the estimated speed value on the basis of the current value, the voltage value, the upper limit current characteristic value, an upper limit voltage characteristic value that is the voltage characteristic value measured at a time when the current value is the upper limit current characteristic value, the minimum rotation speed characteristic value and the counter-electromotive force constant, and
 calculate the estimated speed value on the basis of the current value, the voltage value, the lower limit current characteristic value, a lower limit voltage characteristic value that is the voltage characteristic value measured at a time when the current value is the lower limit current characteristic value, the maximum rotation speed characteristic value and the counter-electromotive force constant.

6. The motor control device according to claim 1, wherein the processor calculates the estimated speed value (ωM) by substituting the current value (IC), the voltage value (VC), the current characteristic value (ID), the voltage characteristic value (VD), the rotation speed characteristic value (ωD) and the counter-electromotive force constant (K) into the following mathematical expression $$\omega M = \frac{1}{K}\left(VC - \frac{IC}{ID}VD\right) + \omega D \frac{IC}{ID}.$$

7. The motor control device according to claim 1, wherein the processor is configured to calculate an estimated resistance value that is an estimated value of a resistance of the motor on the basis of the current characteristic value, the voltage characteristic value, the rotation speed characteristic value and the counter-electromotive force constant.

* * * * *